United States Patent
Min et al.

(10) Patent No.: US 9,741,995 B2
(45) Date of Patent: Aug. 22, 2017

(54) BATTERY SYSTEM IMPROVING OPERATION RELIABILITY OF SWELLING CID

(71) Applicant: Hyundai Motor Company, Seoul (KR)

(72) Inventors: Hong Seok Min, Gyeonggi-do (KR); Ik Kyu Kim, Seoul (KR); Sung Min Choi, Gyeongsangbuk-do (KR); Seung Ho Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 99 days.

(21) Appl. No.: 14/821,750

(22) Filed: Aug. 9, 2015

(65) Prior Publication Data

US 2016/0141593 A1 May 19, 2016

(30) Foreign Application Priority Data

Nov. 14, 2014 (KR) ........................ 10-2014-0159014

(51) Int. Cl.
*H01M 2/34* (2006.01)
*H01M 10/647* (2014.01)
*H01M 10/655* (2014.01)

(52) U.S. Cl.
CPC ......... *H01M 2/345* (2013.01); *H01M 10/647* (2015.04); *H01M 10/655* (2015.04); *H01M 2200/20* (2013.01); *H01M 2220/20* (2013.01)

(58) Field of Classification Search
CPC .. H01M 2/348; H01M 10/647; H01M 10/655; H01M 2200/20; H01M 2220/20
See application file for complete search history.

(56) References Cited

U.S. PATENT DOCUMENTS

| | | | | |
|---|---|---|---|---|
| 5,405,715 A * | 4/1995 | Dawson | .............. | H01M 2/0207 429/162 |
| 6,004,694 A * | 12/1999 | Van Lerberghe | ....... | H01M 2/34 429/127 |
| 6,376,124 B1 * | 4/2002 | Dodgson | .............. | B01J 19/0093 429/127 |
| 6,392,172 B1 * | 5/2002 | Azema | ................ | H01M 2/1061 200/334 |
| 6,524,741 B1 * | 2/2003 | Bryan | ................. | H01M 2/0207 429/162 |

(Continued)

FOREIGN PATENT DOCUMENTS

EP 2018679 A1 1/2009
FR 2974249 A1 10/2012

(Continued)

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A battery system improving operation reliability of a swelling current interrupt device (CID) is provided. The battery system includes a cooling plate that forms an appearance of a battery in which the swelling CID interrupting a current flow is mounted and includes a swelling aperture formed therein. The swelling aperture induces an expansion of a pouch in which the swelling CID is embedded. Therefore, since the swelling aperture is formed in the cooling plate, improved operation reliability of the swelling CID than a battery system according to related art in which operation reliability was varied based on a thickness of a pouch cell is obtained.

13 Claims, 3 Drawing Sheets

(56) References Cited

U.S. PATENT DOCUMENTS

| | | | | |
|---|---|---|---|---|
| 6,713,209 B1 * | 3/2004 | Naskali | ................... | H01M 2/34 |
| | | | | 429/56 |
| 8,057,933 B2 | 11/2011 | Miyahisa et al. | | |
| 8,105,708 B2 | 1/2012 | Rudorff et al. | | |
| 2004/0232888 A1 | 11/2004 | Burrus, IV et al. | | |
| 2011/0104520 A1 * | 5/2011 | Ahn | ........................ | H01M 2/22 |
| | | | | 429/7 |
| 2013/0337300 A1 * | 12/2013 | Saito | ................... | H01M 2/0212 |
| | | | | 429/61 |

FOREIGN PATENT DOCUMENTS

| | | | |
|---|---|---|---|
| JP | 2004-327047 A | 11/2004 | |
| JP | 2012-069408 A | 4/2012 | |
| JP | 2012-209204 A | 10/2012 | |
| KR | 10-2008-0024108 A | 3/2008 | |
| KR | 10-2012-0064172 A | 6/2012 | |
| KR | 10-2013-0131983 A | 12/2013 | |
| KR | 10-2014-0012264 A | 2/2014 | |

* cited by examiner

BATTERY SYSTEM IMPROVING OPERATION RELIABILITY OF SWELLING CID

CROSS-REFERENCE TO RELATED APPLICATION

This application is based on and claims the benefit of priority to Korean Patent Application No. 10-2014-0159014, filed on Nov. 14, 2014 in the Korean Intellectual Property Office, the disclosure of which is incorporated herein in its entirety by reference.

TECHNICAL FIELD

The present disclosure relates to a battery system that improves operation reliability of a swelling current interrupt device (CID), and more particularly, to a battery system that improves operation reliability of a swelling CID, which allows the swelling CID to be normally operated regardless of a pouch cell size.

BACKGROUND

When operation reliability of a swelling CID embedded in a pouch cell within a vehicle is analyzed, it may be seen that operation reliability of the swelling CID depends on a size of the pouch cell, more particularly, a thickness of the pouch cell, due to a design structure of pouch cells which are adhered to a cooling plate in a thickness direction. In other words, when a pouch cell has a substantially thin thickness, a swelling (e.g., expansion) thickness is restricted by the cooling plate. When a pouch cell has a substantially thick thickness, since substantial swelling space is present between the cooling plates, a swelling delay phenomenon may occur.

SUMMARY

An aspect of the present disclosure provides a battery system that may improve operation reliability of a swelling CID, and may allow the swelling CID to be operated normally regardless of a pouch cell size, by improving a structure of a cooling plate mounted external to the pouch cell.

According to an exemplary embodiment of the present disclosure, a battery system improving operation reliability of a swelling current interrupt device (CID) may include a cooling plate configured to form an appearance of a battery in which the swelling CID configured to interrupt a current flow may be mounted and may have a swelling aperture formed therein, wherein the swelling aperture may induce an expansion of a pouch in which the swelling CID is embedded.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described in detail with reference to the accompanying drawings.

Figure 1:
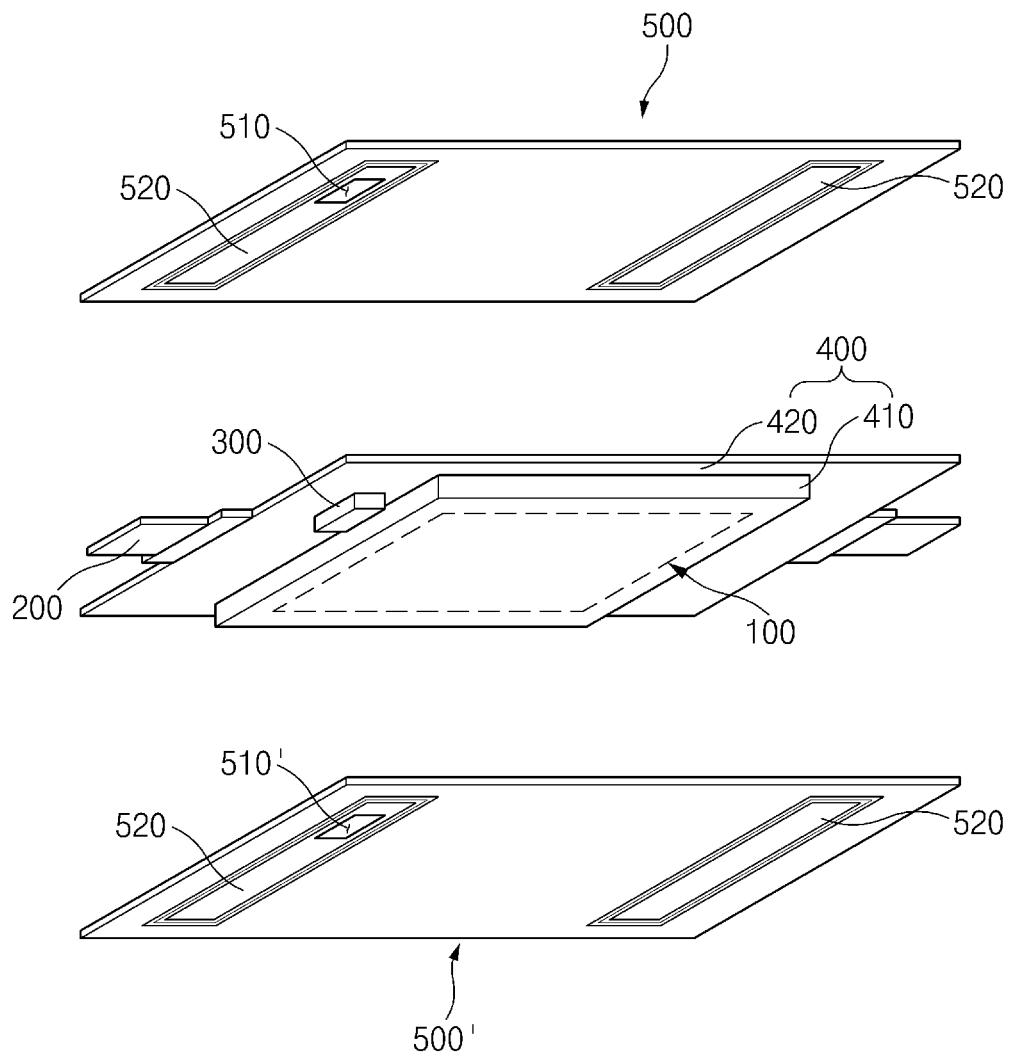
FIG. 1 is a perspective view of main components of a battery system improving operation reliability of a swelling CID according to an exemplary embodiment of the present disclosure.
Figure 2:
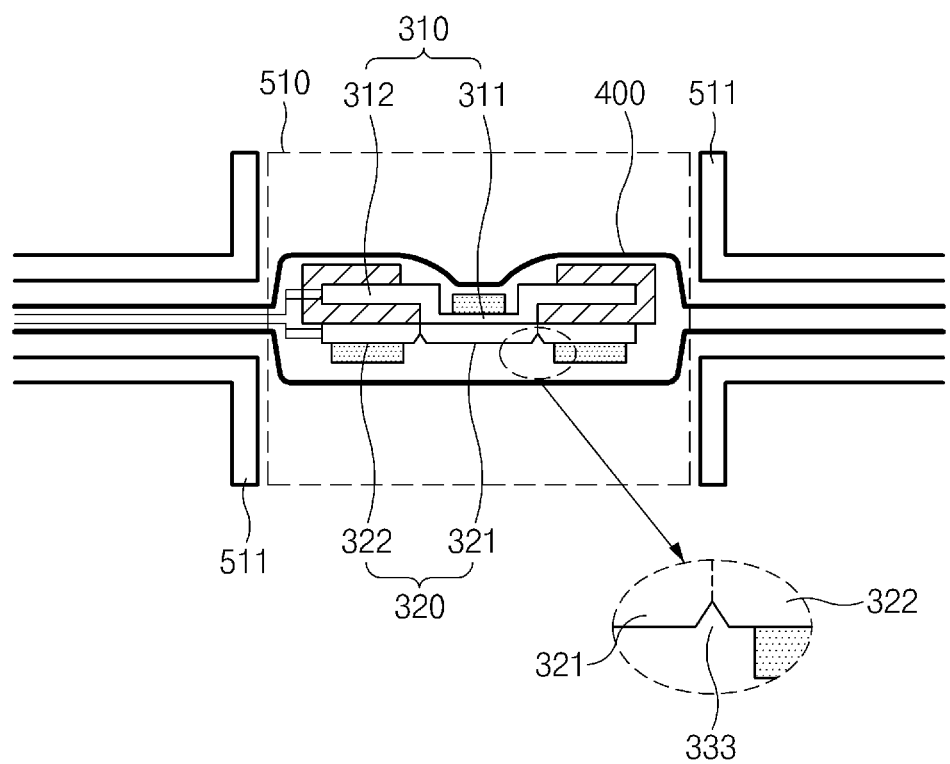
FIG. 2 is a cross-sectional view of main components when the swelling CID of the battery system improving operation reliability of the swelling CID of FIG. 1 is not operated according to an exemplary embodiment of the present disclosure.
Figure 3:
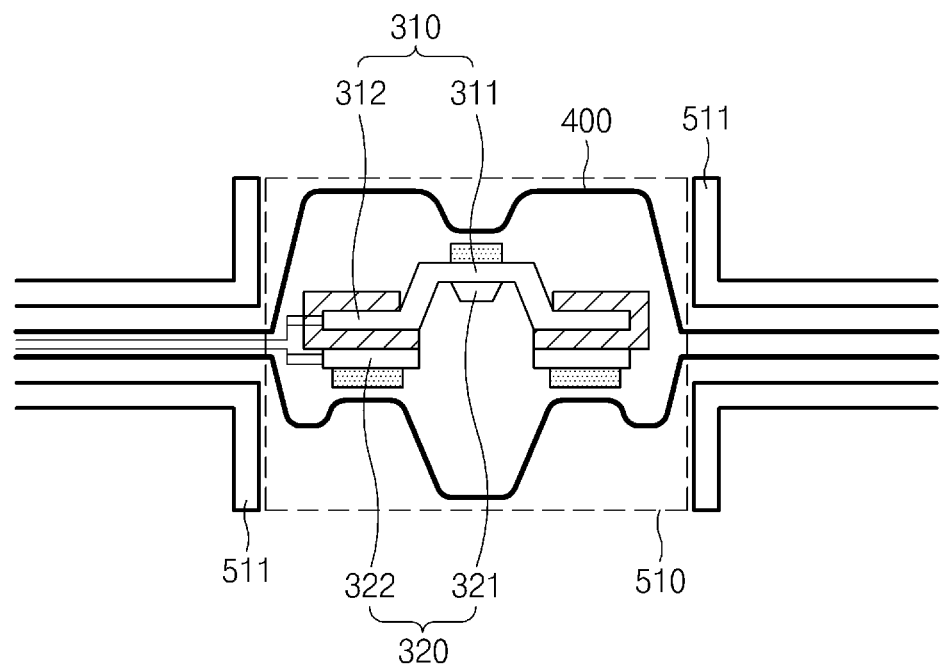
FIG. 3 is a cross-sectional view of main components when the swelling CID of the battery system improving operation reliability of the swelling CID of FIG. 1 is operated according to an exemplary embodiment of the present disclosure.

As shown in FIGS. 1 to 3, a battery system improving operation reliability of a swelling CID according to the present disclosure including a battery part 100, a lead tab 200 configured to connect the battery part 100 to the exterior, a swelling current interrupt device (CID) 300 disposed between the battery part 100 and the lead tab 200, and a pouch 400 configured to package (e.g., house, enclose, etc.) the battery part 100 and the swelling CID 300, may include a cooling plate 500 configured to be adhered to the pouch 400 to cool the battery part 100, wherein a swelling aperture 510 allowing an expansion of the pouch 400 to be concentrated may be formed in the cooling plate 500.

According to an exemplary embodiment of the present disclosure, the battery part 100 may be manufactured in a wound jelly shape which is widely known as a jelly roll. The lead tab 200 may be provided to both ends of the battery part 100 in a width direction of the battery part 100. The pouch 400 may include a center part 410 that covers the battery part 100 and an edge part 420 extended from the center part 410. The cooling plate 500 may be manufactured in a plate shape having about the same area as that of the pouch 400, and may be disposed on each of upper and lower surfaces of the pouch 400.

Further, the cooling plate 500 may include a swelling suppression part 520 which is in contact with the edge part 420 and may protrude from the cooling plate 500 to the edge part 420 to suppress an expansion of the edge part 420. The swelling suppression part 520 may be configured to suppress a swelling (e.g., expansion) of the pouch 400 except for the swelling aperture 510. The swelling CID 300 may be disposed on the edge part 420. In particular, the swelling aperture 510 may be formed to penetrate through the swelling suppression part 520, and the swelling CID 300 may be disposed in the swelling aperture 510.

The swelling aperture 510 may include an expansion width limiting part formed vertically from an inner side of the cooling plate 500 to the exterior of the cooling plate 500. The expansion width limiting part may have a width slightly greater than a width of the swelling CID 300. The swelling CID 300 may include a battery part that connects terminal 310 electrically connected to the battery part 100, and a lead tab that connects terminal 320 disposed on a lower surface of the battery part connecting terminal 310 to be electrically connected to the battery part connecting terminal 310, and electrically connected to the lead tab 200.

In addition, the battery part that connects terminal 310 may include a bending surface part 311 which is in contact with (e.g., abutting) the lead tab connecting terminal 320, formed to be bent to induce deformation of the battery part connecting terminal 310, and may protrude to the lower surface of the battery part connecting terminal 310, and an adhesive part 312 adhered to the lead tab connecting terminal 320 and the pouch 400 through a non-conductive adhesive. An upper surface of the battery part connecting terminal 310 may be adhered to the pouch 400 and the remaining portion 322 except for a cut portion 321 of a lower surface of the lead tab connecting terminal 320 may be attached to the pouch 400. The cut portion 321 may include a V-notching 333 which induces a cutting of the lead tab connecting terminal 320.

The battery system improving operation reliability of the swelling CID 300 according to the present disclosure configured as described above may be maintained in a state in which the pouch 400 may be exposed to the exterior through the swelling aperture 510 when the swelling CID 300 is not operated, as shown in FIG. 2.

When gas is generated due to an over-charging or an abnormal reaction, the pouch 400 may expand and protrude to the exterior of the cooling plate 500 through the swelling aperture 510, as shown in FIG. 3. In particular, the remaining portion 322 except for the bending surface part 311 of the battery part connecting terminal 310 connected to the pouch 400 and the cut portion 321 of the lower surface of the lead tab connecting terminal 320 may penetrate through the swelling aperture 510 together with the pouch 400 and a position thereof may be moved.

In addition, by expansion force of the pouch 400 that pulls the bending surface part 311 of the battery part connecting terminal 310, the cut portion 321 of the lead tab connecting terminal 320 may be cut along the V-notching 333, and a position of the cut portion 321 may be moved when the cut portion 321 is attached to the bending surface part 311. Therefore, an electrical connection between the battery part connecting terminal 310 and the lead tab connecting terminal 320 may be disconnected (e.g., cut off), and battery damage by the over-charging or the abnormal reaction may be prevented.

Since the swelling aperture 510 and the swelling suppression part 520 may be formed in the cooling plate 500, the expansion of the pouch 400 may be concentrated at a particular portion of the pouch 400 that covers the swelling CID 300. Therefore, operation reliability of the swelling CID 300 may be improved regardless of a thickness of the pouch cell.

As described above, according to the exemplary embodiments of the present disclosure, in the battery system improving operation reliability of the swelling CID according to the present disclosure, since the swelling aperture may be formed in the cooling plate, more improved operation reliability of the swelling CID than a battery system according to related art in which operation reliability was varied based on the thickness of the pouch cell may be obtained.

In addition, since operation reliability of the swelling CID may be guaranteed regardless of the size of the pouch cell, a degree of design freedom of the battery system may be guaranteed. Further, since operation performance of the swelling CID may be improved by improving the shape of the cooling plate, the present disclosure may be easily more applied to the battery system according to the related art.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A battery system improving operation reliability of a swelling current interrupt device (CID) including a battery part having a cathode, an anode, and an electrolyte, a lead tab configured to connect the battery part to an exterior, the swelling current interrupt device (CID) disposed between the battery part and the lead tab, and a pouch configured to house the battery part and the swelling CID, the battery system comprising:
   a cooling plate adhered to the pouch to cool the battery part; and
   a swelling aperture formed in the cooling plate to accommodate a concentrated expansion of the pouch.

2. The battery system according to claim 1, wherein the swelling CID includes:
   a battery part connecting terminal electrically connected to the battery part; and
   a lead tab connecting terminal disposed on a lower surface of the battery part connecting terminal to be electrically connected to the battery part connecting terminal, and electrically connected to the lead tab.

3. The battery system according to claim 2, wherein the battery part connecting terminal includes:
   a bending surface part in contact with the lead tab connecting terminal, is formed to be bent to induce deformation of the battery part connecting terminal, and protrudes to the lower surface of the battery part connecting terminal; and
   an adhesive part adhered to the lead tab connecting terminal and the pouch.

4. The battery system according to claim 2, wherein an upper surface of the battery part connecting terminal is adhered to the pouch and the remaining portion except for a cut portion of a lower surface of the lead tab connecting terminal is attached to the pouch.

5. The battery system according to claim 4, wherein the cut portion is provided with a V-notching which induces a cutting of the lead tab connecting terminal.

6. The battery system according to claim 1, wherein the pouch includes:
a center part that covers the battery part; and
an edge part that extends from the center part.

7. The battery system according to claim 6, wherein the cooling plate includes:
a swelling suppression part in contact with the edge part and protrudes from the cooling plate to the edge part to suppress an expansion of the edge part.

8. The battery system according to claim 6, wherein the swelling CID is disposed on the edge part.

9. The battery system according to claim 7, wherein the swelling aperture is formed to penetrate through the swelling suppression part, and the swelling CID is disposed in the swelling aperture.

10. The battery system according to claim 1, wherein the swelling aperture includes:
an expansion width limiting part formed vertically from an inner side of the cooling plate to an exterior of the cooling plate.

11. The battery system according to claim 1, wherein the battery part has a wound jelly shape.

12. A battery system including a battery having a cathode, an anode, and an electrolyte and improving operation reliability of a swelling current interrupt device (CID), the battery system, comprising:
a cooling plate that forms an appearance of a battery in which the swelling CID interrupting a current flow is mounted and includes a swelling aperture formed therein,
wherein the swelling aperture induces an expansion of a pouch in which the swelling CID is embedded.

13. The battery system according to claim 12, wherein the cooling plate includes a swelling suppression part that limits the expansion of the pouch.

* * * * *